United States Patent Office 3,352,920
Patented Nov. 14, 1967

3,352,920
NOVEL D-NOR-PROGESTERONES AND PROCESSES FOR THEIR MANUFACTURE
Jerrold Meinwald, Ithaca, N.Y., assignor to Schering Corporation, Bloomfield, N.J., a corporation of New Jersey
No Drawing. Filed Feb. 25, 1965, Ser. No. 435,363
2 Claims. (Cl. 260—586)

This application is a continuation-in-part of copending application Ser. No. 165,952 of Jerrold Meinwald, filed Jan. 12, 1962, now abandoned.

This invention relates to a new class of steroidal derivatives, to methods for their manufacture, and to novel intermediates produced thereby. More specifically, this invention relates to D-nor-steroids of the pregnane series which have useful therapeutic properties, to processes for their preparation, and to D-nor-steroidal intermediates produced thereby.

The D-nor-steroids of my invention possess a carbon-skeleton ring system as shown in Formula I:

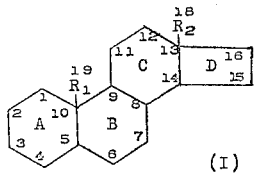

(I)

The rings are identified in the manner of conventional steroid nomenclature. Similarly, the carbon atoms of rings A, B and C are conventionally identified. In ring D, C–17 is eliminated whereby C–16 is directly bonded to C–13. The angular groups attached to positions 10 and 13 retain conventional numbering and, as shown, $R_1$ and $R_2$ represent methyl or hydrogen.

In the conventional steroid nucleus, the six-membered C-ring is fused to the five-membered D-ring in the trans configuration. The D-nor-steroids of the instant invention also possess the trans configuration between the C-ring and the now contracted D-ring.

Heretofore, steroids having a 4-membered cyclic D-ring were unknown. By my invention it is now possible to prepare a new class of 4-membered D-ring steroids (i.e., D-nor-21-desoxy pregnanes), which are characterized by being devoid of a 17-carbon atom and by having attached to the 16-carbon atom, moieties which are identical to those substituted at C–17 of a normal steroid possessing a 5-membered D-ring. My D-nor-steroids include D-nor-21-desoxy pregnanes, having at the 16-carbon atom a substituent possessing an oxygen function.

The D-nor-steroids have been found, in general, to possess therapeutic activities similar to the activities of the corresponding cyclopentyl-D-ring steroidal analog.

This invention thus provides a new class of steroids, i.e., D-nor-21-desoxy pregnanes and, in particular, D-nor-progesterones (D-nor-4-pregnene-3,20-diones) substituted at C–16 by a member selected from the group consisting of hydrogen, hydroxy, and lower alkanolyloxy, including the 19-nor and 1-dehydro analogs thereof.

Representative of the lower alkanoyl groups are radicals of lower alkanoic acids having preferably up to eight carbon atoms such as formic, acetic, propionic, butyric, caproic, valeric and enanthic acids.

This invention thus provides for the following specific D-nor-progesterones:

D-nor-progesterone (D-nor-4-pregnene-3,20-dione);
D-nor-1-dehydroprogesterone;
D-nor-19-nor-progesterone;
D-nor-16α-hydroxyprogesterone;
D-nor-16α-acetoxyprogesterone;
D-nor-16α-hydroxy-1-dehydroprogesterone and
D-nor-16α-acetoxy-1-dehydroprogesterone.

The above compounds are of value as progestational agents, for example, D-nor-19-nor-progesterone exhibits progestational activity in rabbits via the intramuscular route when tested by the Clauberg assay at doses in the range of from about 0.8 mg./kg. to about 4 mg./kg., as well as oral progestational activity in rabbits at 20 mg./kg. The above compounds are also valuable as intermediates in preparing useful steroids including other substituted D-nor-progesterones having progestational activity as discussed in greater detail hereinbelow.

It is to be understood that the above are given as exemplary, it being possible to prepare a D-nor-steroid corresponding to every known C–17 steroid by utilizing procedures known in the art for the normal cyclopentyl-D-ring steroids and substituting as starting compounds the corresponding D-nor-steroid.

The compounds of this invention, e.g., D-nor-19-nor-progesterone, may be administered orally or parenterally by incorporating a therapeutic dosage in conventional dosage forms such as tablets, capsules, elixirs, suspensions, solutions, or the like. They can be administered in admixture with pharmaceutical excipients which are chemically inert to D-nor-progesterone and derivatives thereof, such as, for example, cornstarch, lactose, sucrose, and gum arabic usually in admixture with an additive such as magnesium stearate, talc, and the like. The compositions may contain diluents and dispersing and surface active agents, and may be presented in a syrup, or in non-aqueous suspension, in aqueous suspensions, or in a syrup or in an oil.

The D-nor-progesterones are prepared from 16β-carboxy-D-nor-steroids such as D-nor-4-androstene-3-one-16β-carboxylic acid and D-nor-5-androstene-3β-ol-16β-carboxylic acid by employing techniques analogous to methods known in the art for converting the carboxylic acid moiety in a C–17 carboxylic acid steroid (e.g., 5-androstene-3β-ol-17β-carboxylic acid) to a 17-acetyl, or other 17-substituents of known, normal, cyclopentyl-D-ring steroids.

The 16β-carboxy-D-nor-steroids, necessary intermediates for the preparation of the novel D-nor-pregnanes of this invention, are prepared from 17-keto-androstanes and 17-ketoestranes unsubstituted in the 16-position via my novel process as described in U.S. Patent No. 3,113,142. In brief, my process is represented by the following reaction scheme A, wherein R represents the usual A, B and C-rings of a steroid:

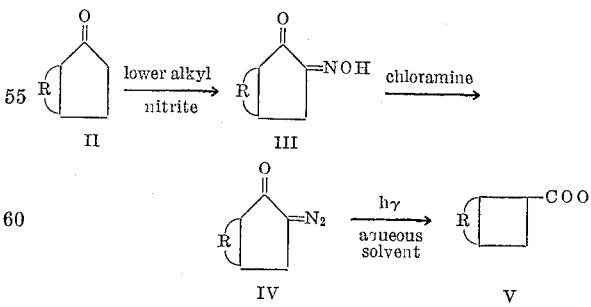

Exemplary of 16β-carboxy-D-nor starting compounds prepared as indicated above are D-nor-androstane-3β-ol-16β-carboxylic acid, D-nor-androstane-3α-ol-16β-carboxylic acid, D-nor-androstane-3-one-16β-carboxylic acid, D-nor-4-androstene-3-one-16β-carboxylic acid, D-nor-5-androstene-3β-ol-16β-carboxylic acid, D-nor-4-androstene-3,11-dione-16β-carboxylic acid, D-nor-4-androstene-11β-ol-3-one-16α-carboxylic acid, D-nor-1,4-androstadiene-3, 11-dione-16β-carboxylic acid, D-nor-1,4,9(11)-androstadiene-3-one-16β-carboxylic acid, 9α-fluoro-D-nor-1,4-androstadiene-11β-ol-3-one-16β-carboxylic acid, 6α-methyl-D - nor-1,4-androstadiene-3,11-dione-16β-carboxylic acid, 6α-fluoro-D-nor-1,4-androstadiene - 3,11 - dione-16β-carboxylic acid and the like.

As mentioned heretofore, the D-nor-pregnanes of this invention are produced from 16-carboxy-D-nor-androstanes such as those listed above by utilizing transformations similar to those used in known conversions involving C–17 cyclopentanoid-D-ring steroid structures. For example, D-nor-progesterone is derived from 3β-hydroxy-16β-carboxy-D-nor-5-androstene which, after protection of the hydroxyl group at C–3 by ester formation, is first converted to the corresponding 16β-acid chloride by treatment with a reagent such as thionyl chloride, phosphorus trichloride, phosphorus pentachloride, and preferably oxalyl chloride. The thus formed acid chloride, e.g., 3β-acyloxy-16β-carbonyl chloride-D-nor-5-androstene, is in turn treated with an alkylating agent such as dimethyl cadmium, giving rise, after hydrolysis of the ester at C–3, to the intermediary D-nor-5-pregnene-3β-ol-20-one which, upon oxidation with chromic acid sulfuric acid reagent, yields D-nor-progesterone. Similarly, when 3β-hydroxy-16β-carboxy-D-nor-19-nor-5-androstene is subjected to the aforedescribed sequence of reactions, there is obtained D-nor-19-nor-progesterone.

Alternatively, D-nor-4-androstene-3-one-16β-carboxylic acid (prepared by the ultraviolet irradiation of 16-diazo-4-androstene-3,17-dione, in turn derived from 16-diazo-5-androstene-3β-ol-17-one by the action of *Flavobacterium dehydrogenans*) is converted to the corresponding acid chloride by the action of oxalyl chloride, followed by reaction with diazomethane, and subsequent reaction of the thereby formed 21-diazo-D-nor-4-pregnene-3,20-dione with hydrogen bromide followed by reaction of the resultant 21-bromo compound with sodium iodide followed by acetic acid to give D-nor-pregesterone.

The 16α-hydroxyl groups are introduced into the D-nor-pregnane molecule by techniques such as those whereby 21-diazo-D-nor-4-pregnene-3,20-dione (prepared as described in Example 1) is converted to D-nor-4-pregnene-16α,21-diol-3,20-dione. Conversion of this latter compound to 16α-hydroxy-D-nor-progesterone is easily effected by esterifying at C–21 with methanesulfonyl chloride followed by reduction of the 21-ester thereby formed by means of sodium iodide in acetone followed by treatment with acetic acid. Esterification of the 16α-hydroxy group in 16α-hydroxy-D-nor-progesterone is conveniently effected by reaction with an acid such as acetic or caproic in the presence of trifluoroacetic anhydride whereby there is formed the 16-acetate and 16-caproate, respectively, of 16α-hydroxy-D-nor-progesterone.

In addition to being useful for protecting hydroxyl groups in processes such as are described herein, the esters of my D-nor-steroids are useful in that the therapeutic activities thereof are generally of longer duration than the corresponding hydroxy-D-nor-steroid.

Introduction of a Δ¹-double bond into my novel D-nor-pregnanes possessing a 3-keto-Δ⁴-system may be effected by known chemical methods such as by means of selenium dioxide or by the use of dichlorodicyanobenzoquinone or alternatively, by microbiological methods utilizing microorganisms such as *Corynebacterium simplex* (A.T.C.C. 6946). For example, D-nor-progesterone, 16α-hydroxy-D-nor-progesterone (prepared as described hereinabove) are subjected to the action of *Corynebacterium simplex* according to procedures described in U.S. Patent No. 2,837,464 for conversion to D-nor-1-dehydro-progesterone (D - nor - 1,4 - pregnadiene-3,20-dione) and 16α-hydroxy-1-dehydro-D-nor-progesterone (D - nor-1,4-pregnadiene-16α-ol-3,20-dione), respectively.

The Δ¹-4,5-dihydro-D-nor-pregnene analogs of D-nor compounds may be obtained from the corresponding 3-keto-D-nor 4-pregnanes. For example, D-nor-progesterone subjected to the action of hydrogen in the presence of a catalyst such as palladium in a solvent such as ethanol, ethyl acetate or tetrahydrofuran yields D-nor-5α-pregnane-3,20-dione. Reaction of the aforementioned D-nor-5α-pregnane with one equivalent of a halogen such as bromine yields the respective 2-bromo-analog which is dehydrohalogenated with a reagent such as collidine or dimethylformamide in the presence of calcium carbonate yielding D-nor-5α-1-pregnene-3,20-dione.

It is to be understood that in the specification and in the examples, the conversions shown are by way of illustration only, it being obvious to one skilled in the art that analogous transformations may be carried out when other intermediates are used.

In general, the following additional groups will not interfere with the processes of this invention:

Hydroxy or acyloxy groups at one or more of positions 6, 11 and 15;

Keto groups at position 11;

Lower alkyl groups containing up to 4 carbon atoms and preferably methyl at one or more of positions such as at C–1, 2, 6 and 15;

Halogeno group, and particularly fluoro and chloro at one or more of positions C–6, 9, 11, and 15;

And unsaturated linkages.

When preparing D-nor steroids of this invention which are substituted at one or more of carbon atoms 2, 4, 6, 9, 11 and 15, it is preferable, as described hereinabove, to have all the substituents mentioned above in the 16β-carboxy-D-nor-steroid starting intermediate prior to building up the C–16 pregnane side chain. However, substituents may be introduced in the molecule at any point during the preparation of the D-nor-pregnanes, by utilizing procedures known in the art.

For example, 9α,11β - dihalogeno-D-nor-progesterones are prepared by utilizing techniques on my D-nor-9(11)-dehydroprogesterones similar to those described for the 9(11)-dehydro derivatives of normal, cyclopentyl D-ring steroids in U.S. Patents Nos. 2,894,963 and 3,009,928–3,009,953. When a 9α,11β-dihalogeno-D-nor-progesterone is desired, the requisite 9(11)-dehydro intermediate is prepared by introducing an 11β-hydroxyl group into a D-nor-progesterone, such as 16α-acetoxy-D-nor-progesterone, by the action of *Curvularia lunata* followed by treatment of the 11β,16α-dihydroxy-D-nor-progesterone 16-acetate thereby formed with methanesulfonyl chloride in dimethylformamide to give 16α-acetoxy-D-nor-9(11)-dehydroprogesterone. Reaction with chlorine in acetic acid according to known techniques yields 9α,11β-dichloro-16α-acetoxy-D-nor-progesterone which, in addition to possessing progestational activity is valuable as a topical anti-inflammatory agent.

Substituents such as α-hydroxy, α and β-lower alkyl, and α and β-halogeno may be introduced into the D-nor steroid nucleus at C–15 utilizing procedures similar to known methods for the introduction of these moieties at C–16 of a C–17 cyclopentanoid-D-ring steroid. For example, to introduce a 15α-methyl group into D-nor-pregneneolone (D-nor-5-pregnene-3β-ol-20-one) (prepared as described in Example 1D) the requisite 15-dehydro intermediate is first prepared by brominating D-nor-pregneneolone in chloroform with bromine, followed by treatment of the 5,6,16-tribromo derivative thereby formed with sodium iodide in acetone to give 16-bromo-D-nor-5-pregnene-3β-ol-20-one which is heated with collidine to give the desired D-nor-5,15-pregnadiene-3β-ol-20-one. In similar manner, when D-nor-pregnane-3β-ol-20-one is brominated then dehydrobrominated as described above, there is obtained D-nor-15-pregnene-3β-ol-20-one. Addition of a standard Grignard reagent, such as methyl magnesium iodide to a 15-dehydro-D-nor-steroid utilizing known techniques will result in the production of the corresponding 15α-methyl derivative, e.g., 15α-methyl-D-nor-5-pregnene-3β-ol-20-one.

When other 15α-lower alkyl derivatives are desired, other corresponding lower alkyl Grignard reagents are employed, e.g., ethylmagnesium bromide and isopropyl magnesium iodide or t-butyl magnesium iodide, whereby is obtained the corresponding 15α-ethyl-, 15α-isopropyl-, and 15α-t-butyl derivatives of D-nor-5-pregnene-3β-ol-20-one.

One method of introducing a 15β-lower alkyl group into a D-nor-steroid such as D-nor-5α-15-pregnene-3β-ol-20-one, involves reaction of the 15-dehydro-bond with diazomethane whereby is obtained 15,16-pyrazoline-D-nor-5α-pregnane-3β-ol-20-one which, after pyrolysis at or above the melting point of the pyrazoline intermediate yields the corresponding 15-methyl - 15 - dehydro-D-nor-steroid, e.g., 15-methyl-D-nor-5α-15-pregnene-3β-ol-20-one. Although it is preferred to pyrolyze by heating the pyrazoline above its melting point, such pyrolysis may be effected by heating the substance in a high boiling, inert solvent, such as p-cymene, or tetraline or the like. The unsaturation at C–15 in the D-nor-ring is conveniently removed by reductive hydrogenation preferably in the presence of a catalyst, such as palladium, whereupon there is obtained 15β-methyl-D-nor-5α-pregnane-3β-ol-20-one 3-acetate. In a similar manner, D-nor-5,15-pregnadiene-3β-ol-20-one upon reaction with diazomethane followed by pyrolysis and subsequent partial hydrogenation, yields 15β-methyl-D-nor-5-pregnene-3β-ol-20-one. Where the 15β-ethyl, 15β-propyl, or 15β-butyl derivative is desired, the corresponding diazoethane, diazopropane, diazobutane, or the like is used in the aforedescribed procedure.

The 15-alkyl-15-dehydro intermediates prepared as described above are also valuable intermediates in the preparation of novel 15-methylene-D-nor-steroids. Thus, utilizing known techniques, 15-methyl-D-nor-5,15-pregnadiene-3β-ol-20-one upon treatment with alkaline hydrogen peroxide yields the corresponding 15α,16α-epoxide, i.e., 15α, 16α - oxide - 15β - methyl - D - nor - 5 - pregnene - 3β-ol-20-one. Treatment of the 15α,16α-oxido-D-nor-steriod with a hydrogen halide, e.g., hydrogen bromide produces the corresponding 15-methylene-16α-hydroxy derivative, e.g., 15-methylene-D-nor-5-pregnene-3β,16β-diol-20-one. The action of the microorganism *Flavobacterium dehydrogenans* utilizing conventional techniques will convert 15-methylene-D-nor-5-pregnene-3β,16α-diol-20-one to 15-methylene-16α-hydroxy-D-nor-progesterone (15-methylene-D-nor-4-pregnene-16α-ol-3,20-dione) which may be acetylated with acetic anhydride and p-toluene sulfonic acid to give 15-methylene-16α-acetoxy-D-nor-progesterone, which is a potent progestational agent via the oral route.

From the 15-methylene-16α-hydroxy-D-nor-progesterones produced as described hereinabove, there may be obtained valuable 21-oxygenated 15-methylene pregnanes possessing cortical activities. Thus, for example, 15-methylene-16α-hydroxy-D-nor-progesterone is transferred by oxidation with *Rhizopus nigricans* into the corresponding 11α-hydroxy derivative, which, in turn, is transformed by the action of iodine/calcium oxide into the 21-iodo derivative, transformed by acetolysis into the 21-acetoxy derivative, 15-methylene-D-nor-4-pregnene-11α, 16α,21-triol-3,20-dione 21-acetate. The conversion of the 11α-hydroxy system to the corresponding 9α-fluoro-11β-hydroxy system follows methods similar to those well known in the art as described heretofore whereby is obtained 9α-fluoro-15-methylene-D-nor-hydrocortisone 21-acetate, which on incubation with *Corynebacterium simplex* gives 9α-fluoro-15-methylene-D-nor-prednisolone, a powerful corticoid, valuable as an anti-inflammatory. Alternatively, treatment of 15-methylene-16α-hydroxy-D-nor-progesterone with the microorganism *Curvularia lunata* gives the corresponding 11β-hydroxy derivative, 15 - methylene - D - nor - 4 - pregnene – 11β,16α - diol-3,20-dione which after treatment with iodine/calcium oxide to the 21-iodo derivative followed by acetolysis yields 15-methylene-D-nor-hydrocortisone 21-acetate; the latter is converted to the 15-methylene-D-nor-prednisolone by *Corynebacterium simplex*.

The 15-methylene-D-nor-steroids prepared as described hereinabove are convertible by reduction into the corresponding 15α- and 15β-methyl analogs. Thus, for example, 15-methylene-16α-hydroxy-D-nor-progesterone upon reduction with one equivalent of hydrogen with palladium on charcoal as catalyst yields a mixture of the 15α-methyl and 15β-methyl isomers of 15-methyl-16α-hydroxy-D-nor-progesterone which are each separated utilizing chromatographic techniques whereby there is obtained 15α-methyl-16α-hydroxy-D-nor-progesterone and 15β-methyl-16α-hydroxy-D-nor-progesterone.

The 15-methyl-D-nor-corticoids of my invention may alternatively be prepared from the 15-methyl-D-nor-pregnenolones, i.e., 15α-methyl-D-nor-5-pregnene-3β-ol-20-one and 15β-methyl-D-nor-5-pregnen-3β-ol-20-one by conversion to the 15-methyl-D-nor-progesterones via Oppenauer oxidation, hydroxylation with *Glomerella cingulata* or *Rhizopus nigricans* according to known procedures to give 15α-methyl-11α-hydroxy-D-nor-progesterone and 15β-methyl-11α-hydroxy-D-nor-progesterone, respectively. The latter compounds are oxidized to the 11-ketones with chromic acid and then carried through the sequence of reactions for the elaboration of the corticoid structures according to procedures outlined in J. Am. Chem. Soc. 77: 4436 (1955) to give 15α-methyl-D-nor-prednisolone and 15β-methyl-D-nor-prednisolone respectively.

Still alternatively, 15α-methyl-9α-fluoro-D-nor-prednisolone may be prepared from 15α-methyl-D-nor-5-pregnene-3β-ol-20-one according to procedures outlined in J. Am. Chem. Soc. 80: 4431 (1958) for the preparation of 16α-methyl-9α-fluoro-prednisolone.

The introduction of a 15α-hydroxyl group in my novel 15-unsubstituted-D-nor-steroids is conveniently effected utilizing microorganisms such as *Hormodendrum olivaceum*. (A.T.C.C. 13, 596), *Collectotrichum antirrhea*, *Penicillium notula*, *Calonectria decora* (by methods disclosed in German Patent 1,067,020) *Gibberella baccata* and *Gibberella saubineth*. A preferred method is to introduce the 15α-hydroxy group via *Hormodendrum olivaceum* (A.T.C.C. 13, 596) according to procedures similar to those described for a C–17 cyclopentyl-D-ring steroid by S. Bernstein et al. J. Am. Chem. Soc. 82: 3685 (1960).

The process of this invention may be used in the preparation of the following specific D-nor-progesterones and derivatives thereof as disclosed herein:

D-nor-progesterone;
D-nor-19-nor-progesterone;
6α-chloro-D-nor-progesterone;
16α-hydroxy-D-nor-progesterone;
16α-acetoxy-D-nor-progesterone;
16α-caprooxy-D-nor-progesterone;
16α-hydroxy-D-nor-1-dehydroprogesterone;
16α-acetoxy-D-nor-1-dehydro-progesterone;

The following are examples which illustrates my invention. It is to be undestood that the invention is not to be limited to the exact details of operation or exact compounds shown and described, as obvious modifications and equivalents will be apparent to one skilled in the art; the invention is therefore to be limited only by the scope of the appended claims.

EXAMPLE 1

*D-nor-progesterone (D-nor-4-pregnene-3,20-dione)*

A. D-NOR-5-ANDROSTENE-3β-OL-16β-CARBOXYLIC ACID CHLORIDE 3-ACETATE

To 3 g. of D-nor-5-androstene-3β-ol-16β-carboxylic acid 3-acetate in 25 ml. of anhydrous benzene add 2.5 ml. of oxalyl chloride and heat the mixture under reflux for one hour. Distill the benzene in vacuo under anhydrous conditions. The resultant residue of substantially D-nor-5-androstene-3β-ol-16β-carboxylic acid chloride 3-acetate is used without further purification in the procedure immediately following.

B. 21-DIAZO-D-NOR-5-PREGNENE-3β-OL-20-ONE 3-ACTATE

To a solution of 1 g. of D-nor-5-androstene-3β-ol-16β-carboxylic acid chloride 3-acetate in 25 ml. of benzene add a solution of diazomethane in ether until a persistent yellow color is obtained. Allow the mixture to stand at room temperature for 30 minutes, then concentrate under reduced pressure to a residue of 21-ddiazo-D-nor-5-pregnene-3β-ol-20-one 3-acetate. Purify by crystallization from ether-hexane.

C. D-NOR-5-PREGNENE-3β-OL-20-ONE 3-ACETATE

To a solution of 500 mg. of 21-diazo-D-nor-5-pregnene-3β-ol-20-one 3-acetate in 50 ml. of ether add a solution of about 500 mg. of hydrogen bromide in 15 ml. of ether. Stir the mixture at room temperature for 30 minutes then wash the solution with cold water, cold sodium bicarbonate solution and again with water, then dry over magnesium sulfate and concentrate under reduced pressure. To the resultant residue containing 21-bromo-D-nor-5-pregnene-3β-ol-20-one 3-acetate add 15 ml. of acetone and a solution of 1.5 g. of sodium iodide in 15 ml. of acetone. Heat the mixture at reflux temperature for one hour then add 1 ml. of acetic acid and heat the mixture under reflux for an additional 30 minutes. Decolorize the resulting brown solution by the addition of aqueous sodium bisulfite then pour the mixture into ice water. Filter the resulting precipitate, wash with water and dry to give D-nor-5-pregnene-3β-ol-20-one 3-acetate. Purify by crystallization from hexane.

Alternatively, the compound of this example is prepared as follows:

Prepare two equivalents of dimethyl cadmium in benzene according to the procedure in F. A. Shirley, "Organic Reactions," vol. VIII, John Wiley and Sons, Inc., New York, N.Y. (1954). Add this benzene solution of dimethyl cadmium slowly and dropwise to a well stirred solution of D-nor-5-androstene-3β-ol-16β-carboxylic acid chloride 3-acetate prepared as described (in Example 1A), in 50 ml. of dry benzene. Stir the resultant mixture for 1 hour and then reflux for 15 minutes.

Acidify the reaction mixture then extract with ether. Combine the ethereal extracts, wash with 3 N hydrochloric acid, water, then with sodium bicarbonate solution, and dry over magnesium sulfate. Evaporate the ether and chromatograph the resultant residue over Woelm neutral alumina, activity grade III, eluting with 7:3 hexane-benzene. Combine the eluates and evaporate to a residue of D-nor-5-pregnene-3β-ol-20-one 3-acetate. Purify by recrystallization from hexane.

D. D-NOR-5-PREGNENE-3β-OL-20-ONE

Dissolve 300 mg. of D-nor-5-pregnene-3β-ol - 20 - one 3-acetate in a mixture of 10 ml. of acetone and 20 ml. of 5% hydrochloric acid in 90% aqueous methanol. Allow the solution to stand at room temperature for 24 hours then remove about half the solvent under reduced pressure. Pour the residual solution into ice water, filter the resultant precipitate of D-nor-5-pregnene-3β-ol. Purify by crystallization from acetone-hexane.

E. D-NOR-PROGESTERONE

To a solution of 250 mg. of D-nor-5-pregnene-3β-ol-20-one in 10 ml. of acetone chilled to 5° C., add dropwise chromic acid-sulfuric acid reagent (266 mgm. $CrO_3$/ml.) until a permanent orange color is obtained. Keep the solution at room temperature for 5 minutes then add a little methanol to destroy any excess reagent. Pour the solution into ice water and *extract* with ether. Combine the ether extracts, wash, dry over magnesium sulfate, and evaporate in vacuo to a residue of D-nor-progesterone. Purify as follows:

Dissolve the residue in acetone to which has been added about 2 ml. of 3 N hydrochloric acid. Allow the solution to stand at room temperature for 1 hour then pour into water. Filter the resultant precipitate, wash with water, dry, and crystallize from acetone-hexane.

EXAMPLE 2

*Alternate procedure for the preparation of D-nor-progesterone*

A. 16-DIAZO-4-ANDROSTENE-3,17-DIONE

Subject 16-diazo-5-androstene-3β-ol-17-one to the action of a culture of *Flavobacterium dehydrogenans* (Rutgers Collection No. 130) as follows:

The culture of the organism is prepared by propagating it in a nutrient agar medium at 30° C. for 24 to 72 hours. During incubation, the inoculated tube is exposed to light with the resultant development of a yellow pigment characteristic of the species. The developed culture is rinsed from an agar slant under sterile conditions into a sterile medium of pH 6.8 and having the following composition:

| | |
|---|---|
| Yeast extract (Difco) _____gm__ | 10 |
| Potassium phosphate monobasic _____gm__ | 4.48 |
| Sodium phosphate dibasic _____gm__ | 4.68 |
| Tap water to 1 liter. | |

This culture medium has previously been autoclaved, at 15 lb. pressure, for twenty minutes to obtain aseptic conditions, and cooled. The variant is grown in the medium under constant illumination, using the visible range of the spectrum. The incubation temperature is maintained at about 33° C. and is conducted under aerobic conditions. Aeration is accomplished by agitation and/or blowing air through the culture medium.

After the organism has grown for 12 to 24 hours (or longer, if desired), 100 ml. of the growing culture are introduced into each of ten flasks, and to each flask are added 200 mg. of 16-diazo-5-androstene-3β-ol-17-one dissolved in a minimum volume of ethanol. The reaction mixtures are then shaken at 30° C. for 12 to 72 hours. The reaction is stopped when paper chromatography indicates that there is no more starting material.

The contents of the flasks are combined and extracted with methylene chloride. The extracts are concentrated and the residue is crystallized from acetone-hexane yielding 16-diazo-4-androstene-3,17-dione.

B. D-NOR-4-ANDROSTENE-3-ONE-16β-CARBOXYLIC ACID

Irradiate a solution of 5 g. of 16-diazo-4-androstene-3,17-dione in 5 ml. of aqueous dioxane for 4 hours with a 200 watt Mercury lamp provided with a Corax sleeve. Remove the solvent under reduced pressure and triturate the resultant residue with water and dry giving D-nor-4-androstene-3-one-16β-carboxylic acid. Purify by crystallization from acetone.

C. D-NOR-4-ANDROSTENE-3-ONE-16β-CARBOXYLIC ACID CHLORIDE

Chill in an ice bath a solution of 500 mg. of D-nor-4-androstene-3-one-16β-carboxylic acid in 20 ml. of dry benzene containing 5 drops of pyridine then add 2 ml. of oxalyl chloride. Stir the mixture at room temperature for 1 hour under anhydrous conditions then remove the solvent under reduced pressure. Add 20 ml. of dry benzene to the resultant residue then filter the solution discarding the insolubles. Concentrate the benzene filtrate to a residue of substantially D-nor-4-androstene-3-one-16β-carboxylic acid chloride which is used without further purification in procedure D of this example.

D. 21-DIAZO-D-NOR-4-PREGNENE-3,20-DIONE

To a solution of the D-nor-4-androstene-3-one-16β-carboxylic acid chloride, prepared in Example 2C, in 20 ml. of benzene, add an ethereal solution of diazomethane until a persistent yellow color is obtained. Keep the mixture at room temperature for 30 minutes then concentrate in vacuo to a residue substantially of 21-diazo-D-nor-4-pregnene-3,20-dione. Purify by crystallization from acetone-hexane.

E. D-NOR-4-PREGNENE-3,20-DIONE

In the manner described in Example 1C treat 21-diazo-D-nor-4-pregnene-3,20-dione with hydrogen bromide then allow the resulting 21-bromo-D-nor-4-pregnene-3,20-dione to react with sodium iodide in acetone, followed by acetic acid. Isolate the resultant product in the described manner yielding D-nor-4-pregnene-3,20-dione. Purify by crystallization from acetone-hexane.

EXAMPLE 3

D-nor-1,4-pregnadiene-3,20-dione

D-nor-4-pregnene-3,20-dione is subjected to the action of a culture of *Corynebacterium simplex* (A.T.C.C. No. 6946) in the following manner:

A solution of 1 g. of yeast extract (Difco) in one liter of tap water, the pH of which is adjusted to 6.9, is distributed among ten 300 ml. Erlenmeyer flasks and to each flask is added a loopful, 2 ml., of *Corynebacterium simplex*. The resulting suspensions are incubated at 30° C. on a shaking machine for 18 hours. One-half gram of D-nor-4-pregnene-3,20-dione is dissolved in 25 ml. of acetone and the resulting solution is distributed equally among the ten flasks containing the 18-hour growth of *C. simplex*. The culture containing the D-nor-4-pregnene-3,20-dione is then incubated at 30° C. for 24 hours. At the end of 24 hours, the contents of the flasks are combined and extracted with a total of 3 liters of chloroform. The crude chloroform extract from the transformation is then concentrated to a residue which is crystallized from methylene chloride-hexane, affording D-nor-1,4-pregnadiene-3,20-dione.

EXAMPLE 4

6α-chloro-D-nor-4-pregnene-3,20-dione

A. 5,6-DICHLORO-D-NOR-PREGNANE-3β-OL-20-ONE

To a solution of 1 g. of D-nor-5-pregnene-3β-ol-20-one (the compound of Example 1D) in a mixture of 25 ml. of carbon tetrachloride and 5 ml. of methylene chloride containing 0.75 ml. of pyridine add at —20° C. a solution of 240 mg. of chlorine in 2.7 ml. of carbon tetrachloride. Stir the mixture at —20° C. for 30 minutes then allow to warm to room temperature over a period of 30 minutes. Dilute the reaction mixture with methylene chloride and wash the organic solution with water, sodium thiosulfate solution, and again with water. Dry the methylene chloride solution with magnesium sulfate then concentrate to a residue of substantially 5,6-dichloro-D-nor-pregnane-3β-ol-20-one. Purify by crystallization from methylene chloride-pentane.

B. 5,6-DICHLORO-D-NOR-PREGNANE-3,20-DIONE

Oxidize 5,6-dichloro-D-nor-pregnane-3β-ol - 20 - one with chromic acid-sulfuric acid reagent according to the procedure of Example 1E. Isolate the resulting product in the described manner yielding 5,6-dichloro-D-nor-pregnane-3,20-dione.

C. 6α-CHLORO-D-NOR-4-PREGNENE-3,20-DIONE

Pass a stream of hydrogen chloride through a solution of 150 mg. of 5,6-dichloro-D-nor-pregnane-3,20-dione in 20 ml. of acetone chilled to 0° C. for 1 hour. Keep the reaction mixture at 0° C. for 2 hours longer than concentrate in vacuo to a residue of about 5 ml. Pour the residue into water and filter the resulting precipitate, wash with water, and dry yielding substantially 6α-chloro-D-nor-4-pregnene-3,20-dione. Purify by crystallization from acetone-hexane.

EXAMPLE 5

D-nor-4-pregnene-16α,21-diol-3,20-dione

A. 21,21-DIBROMO-D-NOR-4-PREGNENE-3,20-DIONE

To a stirred solution of 5 g. if 21-diazo-D-nor-4-pregnene-3,20-dione (the compound of Example 1B) in 100 ml. of chloroform add dropwise a solution of 2.5 g. of bromine in 15 ml. of chloroform. Continue stirring until the bubbling has stopped and the bromine color has been discharged. Remove the solvent at room temperature under reduced pressure to a residue of substantially 21,21-dibromo-D-nor-4-pregnene-3,20-dione which is used without further purification in the procedure immediately following.

B. METHYL D-NOR-4,16(20)-PREGNADIENE-3-ONE-21-OATE

To a solution of 2 g. of 21,21-dibromo-D-nor-4-pregnene-3,20-dione in 40 ml. of methanol add 15 ml. of an 8% solution of sodium methoxide in methanol. Stir the mixture under nitrogen at room temperature for 16 hours then pour it into cold water and extract the mixture with chloroform. Wash the combined chloroform extracts with water then concentrate under reduced pressure to a residue of substantially methyl D-nor-4,16(20)-pregnadiene-3-one-21-oate. Purify the residue by chromotography on Florisil eluting with hexane-ether-acetone mixtures. Combine like fractions on the basis of ultraviolet and infrared spectra, retaining those fractions wherein the infrared spectra indicates the presence of an ester group and whose ultraviolet spectra indicates the presence of two conjugated systems. Combine the selected fractions and concentrate to a residue and crystallize from acetone-hexane.

C. METHYL D-NOR-5,16(20)-PREGNADIENE-3-ONE-21-OATE 3-ETHYLENE KETAL

To a solution of 1.5 g. of methyl D-nor-4,16(20)-pregnadiene-3-one-21-oate in 150 ml. of benzene add 7.5 ml. of ethylene glycol and 0.15 g. of p-toluenesulfonic acid. Stir the mixture at reflux temperature for 6 hours then cool and wash with 100 ml. of 1% aqueous sodium bicarbonate. Put the washed benzene solution on a column of Florisil and elute with ether. Combine the fractions and evaporate to a residue containing substantially methyl D-nor-5,16(20) - pregnadiene - 3 - one - 21 - oate 3-ethylene ketal. Purify by crystallization from acetone-hexane.

D. D-NOR-5,16(20)-PREGNADIENE-21-OL-3-ONE 3-ETHYLENE KETAL

Add dropwise with stirring a solution of 1 g. of methyl D-nor,5,16(20)-pregnadiene-3-one-21 - oate 3 - ethylene ketal in 50 ml. of freshly distilled tetrahydrofuran, to a suspension of 500 mg. of lithium aluminum hydride in 25 ml. of tetrahydrofuran. Heat the mixture at reflux temperature for 1 hour then chill and add dropwise 10 ml. of ethyl acetate followed by 5 ml. of a saturated aqueout solution of sodium sulfate. Finally add some solid sodium sulfate and filter the mixture. Remove the solvent from the filtrate under reduced pressure to a residue of substantially D-nor-5,16(20)-pregnadiene-21-ol - 3 - one 3-ethylene ketal. Purify by crystallization with ether.

E. D-NOR-4,16(20)-PREGNADIENE-21-OL-3-ONE

To a solution of 500 mg. of D-nor-4,16(20)-pregnadiene-21-ol-3-one 3-ethylene ketal in 40 ml. of 80% aqueous acetone add 0.5 ml. of sulfuric acid. Keep the mixture at room temperature for 18 hours then add aqueous sodium bicarbonate until the solution is basic. Concentrate the basic solution to remove most of the acetone then add water. The resultant precipitate is filtered, washed with water, and dried giving substantially D-nor-4,16(20)-pregnadiene-21-ol-3-one. Purify by crystallization from acetone-hexane.

F. D-NOR-4,16(20)-PREGNADIENE-21-OL-3-ONE 21-ACETATE

To a solution of 2 g. of D-nor-4,16(20)-pregnadiene-21-ol-3-one in 10 ml. of pyridine add 2 ml. of acetic anhydride and keep the mixture at room temperature overnight, then pour the mixture into ice water and stir for 30 minutes. Filter the resulting precipitate of substantially D-nor-4,16(20)-pregnadiene-21-ol-3-one 21-acetate then wash with water and dry. Purify by crystallization from acetone-hexane.

G. D-NOR-4-PREGNENE-16α,21-DIOL-13,20-DIONE 21-ACETATE

To a solution of 500 mg. of D-nor-4,16(20)-pregnadiene-21-ol-3-one 21-acetate in 50 ml. of dry t-butanol add 0.3 ml. of pyridine and 1.2 ml. of t-butanol containing 11 mg. of osmium tetroxide. To this mixture add dropwise with stirring 4.8 ml. of an 0.82 N solution of hydrogen peroxide in dry t-butanol. Keep the reaction mixture at room temperature for 5 hours then bubble nitrogen through the solution for 15 minutes followed by the addition of 600 mg. of sodium sulfite in 30 ml. of water. After 5 minutes neutralize the mixture with 10% acetic acid and dilute with 200 ml. of water then extract with chloroform. Wash the combined extracts with water, then concentrate to a residue under reduced pressure. Dissolve the residue in a mixture of 5 ml. of pyridine and 1 ml. of acetic anhydride and allow to stand overnight. Pour the mixture into ice water and filter the resulting precipitate of substantially D-nor-4-pregnene-16α,21-diol-3,20-dione 21-acetate. Purify by crystallization from acetone-hexane.

H. D-NOR-4-PREGNENE-16α,21-DIOL-3,20-DIONE

To a solution of 250 mg. of D-nor-4-pregnene-16α-21-diol-3,20-dione 21-acetate in 25 ml. of methanol add 1.5 ml. of 10% aqueous potassium carbonate and stir the mixture under nitrogen 1 hour. The mixture is then neutralized with 10% acetic acid, diluted with water, and the methanol removed under reduced pressure. Filter the resulting precipitate of substantially D-nor-4-pregnene-16α,21-diol-3,20-dione. Purify by crystallization from acetone-hexane.

EXAMPLE 6

*D-Nor-4-pregnene-16α-ol-3,20-dione and 16 esters thereof*

A. D-NOR-4-PREGNENE-16α,21-DIOL-3,20-DIONE 21-p-TOLUENESULFONATE

To a solution of 1 g. of D-nor-4-pregnene-16α,21-diol-3,20-dione in 20 ml. of pyridine chilled to −20° C. add a solution of 1 g. of p-toluenesulfonyl chloride in 5 ml. of methylene chloride. Stir the mixture at −20° C. overnight then add a few pieces of ice to the reaction mixture and dilute with methylene chloride. Wash the organic solution with water, dilute hydrochloric acid, sodium bicarbonate, then water, then dry over magnesium sulfate and concentrate under reduced pressure to a residue of substantially D-nor-4-pregnene-16α,21-diol-3,20-dione 21-p-toluenesulfonate. Purify by crystallization from acetone-hexane.

B. D-NOR-4-PREGNENE-16α-OL-3,20-DIONE

Warm a solution of 300 mg. of D-nor-4-pregnene-16α,21-diol-3,20-dione 21-p-toluenesulfonate in 10 ml. of acetone then add a warm solution of 1 g. of sodium iodide in 5 ml. of acetone. Warm the mixture on a steam bath for 15 minutes then add 1 ml. of acetic acid and heat the mixture an additional 15 minutes. Add sodium bisulfite solution until the color of the reaction mixture is discharged, then dilute with water. Filter the resulting precipitate of substantially D-nor-4-pregnene-16α-ol-3,20-dione and wash with water and dry. Purify by crystallization from acetone-hexane.

C. D-NOR-4-PREGNENE-16α-OL-3,20-DIONE 16-ACETATE

Heat a solution of 2 g. of D-nor-4-pregnene-16α-ol-3,20-dione in a mixture of 20 ml. of acetic acid and 4 ml. of trifluoroacetic anhydride on the steam bath under anhydrous conditions for 1 hour. Pour the reaction mixture into ice water and filter the resulting precipitate of substantially D-nor-4-pregnene-16α-ol-3,20-dione 16-acetate. Purify by crystallization from acetone-hexane.

D. D-NOR-4-PREGNENE-16α-OL-3,20-DIONE 16 CAPROATE

Heat a solution of 500 mg. of D-nor-4-pregnene-16α-ol-3,20-dione in a mixture of 5 ml. of caproic acid and 1 ml. of trifluoroacetic anhydride at 80° C. for 45 minutes. Pour the mixture into ice water and bring to neutrality with sodium carbonate. Extract the mixture with methylene chloride. Wash the combined extracts with water, dry over magnesium sulfate then concentrate to a residue of substantially D-nor-4-pregnene-16α-ol-3,20-dione 16-caproate. Purify by crystallization from ether.

EXAMPLE 7

*D-nor-1,4-pregnadiene-16α-ol-3,20-dione and the 16-acetate ester thereof*

A. D-NOR-1,4-PREGNADIENE-16α-OL-3,20-DIONE

Subject D-nor-4-pregnene-16α-ol-3,20-dione to the action of a culture of *Corynebacterium simplex* in the manner described in Example 3. The resultant product is isolated in the described manner and purified by crystallization from acetone-hexane yielding D-nor-1,4-pregnadiene-16α-ol-3,20-dione.

B. D-NOR-1,4-PREGNADIENE-16α-OL-3,20-DIONE 16-ACETATE

Acetylate D-nor-1,4-pregnadiene-16α-ol-3,20-dione with acetic acid and trifluoroacetic anhydride in the manner described in Example 6C. Isolate the resultant product in the described manner and purify by crystallization from acetone-hexane giving D-nor-1,4-pregnadiene-16α-ol-3,20-dione 16-acetate.

EXAMPLE 8

*D-nor-19-nor-4-pregnene-3,20-dione (D-nor-19-nor-progesterone)*

A. D-NOR-19-NOR-5-ANDROSTENE-3β-OL-16β-CARBOXYLIC ACID 3-ACETATE

In a manner similar to that described in U.S. Patent No. 3,113,142 (1) treat 19-nor-5-androstene-3β-ol-17-one with potassium in t-butanol and isoamyl nitrite, (2) treat the 16 - oximino-19-nor-5-androstene-3β-ol-17-one produced thereby with chloramine in ether, and (3) esterify the thereby formed 16-diazo-19-nor-3β-ol-17-one by means of acetic anhydride in pyridine to form 16-diazo-19-nor-5-androstene-3β-ol-17-one 3-acetate.

In a manner similar to that described in Example 2B, irradiate 16 - diazo-19-nor-5-androstene-3β-ol-17-one 3-acetate in a dioxane-water solution with ultraviolet light to give D - nor-19-nor-5-androstene-3β-ol-16β-carboxylic acid 3-acetate.

B. D-NOR-19-NOR-5-ANDROSTENE-3β-OL-16β-CARBOXYLIC ACID CHLORIDE 3-ACETATE

In a manner similar to that described in Example 1A, treat D - nor - 19-nor-5-androstene-3β-ol-16β-carboxylic acid 3-acetate with oxalyl chloride in benzene and isolate the resultant product in the described manner to give D-nor-19-nor-5-androstene-3β-ol-16β-carboxylic acid chloride 3-acetate.

C. D-NOR-19-NOR-5-PREGNENE-3β-OL-20-ONE 3-ACETATE

In a manner similar to that described in the alternative procedure of Example 1C, treat D-nor-19-nor-5-androstene-3β-ol-16β-carboxylic acid chloride 3-acetate with dimethyl cadmium in benzene. Isolate the resultant product in the described manner to give D-nor-19-nor-5-pregnene-3β-ol-20-one 3-acetate.

D. D-NOR-19-NOR-5-PREGNENE-3β-OL-20-ONE

In a manner similar to that described in Example 2D, hydrolyze D-nor-19-nor-5-pregnene-3β-ol-20-one 3-acetate with 5% hydrochloric acid in 90% aqueous methanol. Isolate the resultant product in the described manner to give D-nor-5-pregnene-3β-ol-20-one.

E. D-NOR-19-NOR-4-PREGNENE-3,20-DIONE (D-NOR-19-NOR-PROGESTERONE)

In a manner similar to that described in Example 1E, treat D-nor-10-nor-5-pregnene-3β-ol-20-one with chromic acid/sulfuric acid reagent. Then isolate and purify the resultant product in the described manner to give D-nor-19-nor-progesterone.

I claim:

1. A member selected from the group consisting of 16-X-D-nor-progesterone, wherein X is a member selected from the group consisting of hydrogen, hydroxy, and lower alkanolyloxy, and 1-dehydro analogs thereof.

2. A compound according to claim 1 wherein X is hydrogen, said compound being D-nor-progesterone.

References Cited

Fieser et al.: "Steroids," pp. 589 and 590 (1959).

Stecher et al.: "The Merck Index," p. 856 (1960) seventh edition.

Cava et al.: J. Am. Chem. Soc., vol. 84, pp. 115 and 116 (1962).

Meinwald et al.: J. Am. Chem. Soc., vol. 84, pp. 116 and 117 (1962).

Mateos et al.: "Boletin Del Institute Quimica, U.N.A.M.," vol. 13, pp. 3–5 (1961).

LEON ZITVER, *Primary Examiner.*

M. JACOB, *Assistant Examiner.*

UNITED STATES PATENT OFFICE

CERTIFICATE OF CORRECTION

Patent No. 3,352,920                    November 14, 1967

Jerrold Meinwald

It is hereby certified that error appears in the above numbered patent requiring correction and that the said Letters Patent should read as corrected below.

Column 2, lines 59 to 64, for that portion of formula V reading "——COO" read -- ——COOH --; column 5, line 37, for "16α-oxide" read -- 16α-oxido --; column 7, line 10, for "21-ddiazo" read -- 21-diazo --; column 10, lines 58 and 59, for "aqueout" read -- aqueous --; line 66, for "D-nor-4,16" read -- D-nor-5,16 --; column 13, line 10, for "D-nor-10-nor" read -- D-nor-19-nor --.

Signed and sealed this 31st day of December 1968.

SEAL)

Attest:

Edward M. Fletcher, Jr.                    EDWARD J. BRENNER

Attesting Officer                         Commissioner of Patents